(12) United States Patent
Patel et al.

(10) Patent No.: US 11,475,654 B1
(45) Date of Patent: Oct. 18, 2022

(54) TECHNOLOGY CONTROL EVALUATION PROGRAM

(71) Applicant: Wells Fargo Bank, N.A., San Francisco, CA (US)

(72) Inventors: Stacey Diane Patel, Gilbert, AZ (US); Audra Ann Bratton, Maricopa, AZ (US); Paul Vincent Zeman, Jr., Concord, NC (US); Denis Michael Hein, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 401 days.

(21) Appl. No.: 16/861,883

(22) Filed: Apr. 29, 2020

(51) Int. Cl.
   *G06F 40/279* (2020.01)
   *G06N 20/00* (2019.01)
   *G06N 3/08* (2006.01)
   *G06V 10/75* (2022.01)

(52) U.S. Cl.
   CPC .......... *G06V 10/751* (2022.01); *G06F 40/279* (2020.01); *G06N 3/08* (2013.01); *G06N 20/00* (2019.01)

(58) Field of Classification Search
   CPC ...... G06V 10/751; G06F 40/279; G06N 3/08; G06N 20/00
   USPC ........................................................ 706/25
   See application file for complete search history.

(56) References Cited

U.S. PATENT DOCUMENTS

| | | |
|---|---|---|
| 8,745,572 B2 | 6/2014 | Zimmermann et al. |
| 8,856,936 B2 | 10/2014 | Datta Ray et al. |
| 8,990,308 B2 | 3/2015 | Wiig et al. |
| 9,705,817 B2 | 7/2017 | Lui et al. |
| 9,967,285 B1 | 5/2018 | Rossman et al. |

(Continued)

FOREIGN PATENT DOCUMENTS

| | | |
|---|---|---|
| CN | 108241964 A | 7/2018 |
| JP | 2017182407 A | 10/2017 |

OTHER PUBLICATIONS

Boulton, Clint, "Slack CEO describes 'Holy Grail' of virtual assistants", IDG Communications, Inc., [Online], Retrieved from the Internet: <URL: https://www.cio.com/article/3131536/slack-ceo-describes-holy-grail-of-virtual-assistants.htmb> (Oct. 17, 2016), 5 pgs.

(Continued)

*Primary Examiner* — Thierry L Pham
(74) *Attorney, Agent, or Firm* — Schwegman Lundberg & Woessner, P.A.

(57) ABSTRACT

Various examples described herein are directed to systems and methods that learn to evaluate data items. A computing device receives data items and evaluates the data items. The evaluation performed by the computing device includes comparing a first data item with a second data item and determining a difference between the first data item and the second data item based on the comparison. The computing device also prepares a recommendation based on the difference between the first data item and the second data item and forwards the recommendation to a subject matter expert. The computing device receives an updated recommendation from the subject matter expert that is based on the recommendation. Using the updated recommendation, the computing device refines the comparing and determining operations where the computing device further learns to evaluate the data items by receiving the updated recommendation and refining the comparing and determining operations.

21 Claims, 11 Drawing Sheets

(56) References Cited

U.S. PATENT DOCUMENTS

| | | |
|---|---|---|
| 2017/0220743 A1 | 8/2017 | Imler et al. |
| 2018/0225471 A1 | 8/2018 | Goyal et al. |
| 2019/0207985 A1 | 7/2019 | Yuan |
| 2019/0251172 A1 | 8/2019 | Jezewski |

OTHER PUBLICATIONS

Jagtiani, Lalit, "Enhancing Software Project Outcomes: Using Machine Learning and Open Source Data to Employ Software Project Performance Determinants (Dissertation)", University of Bridgeport, CT, (2017), 144 pgs.

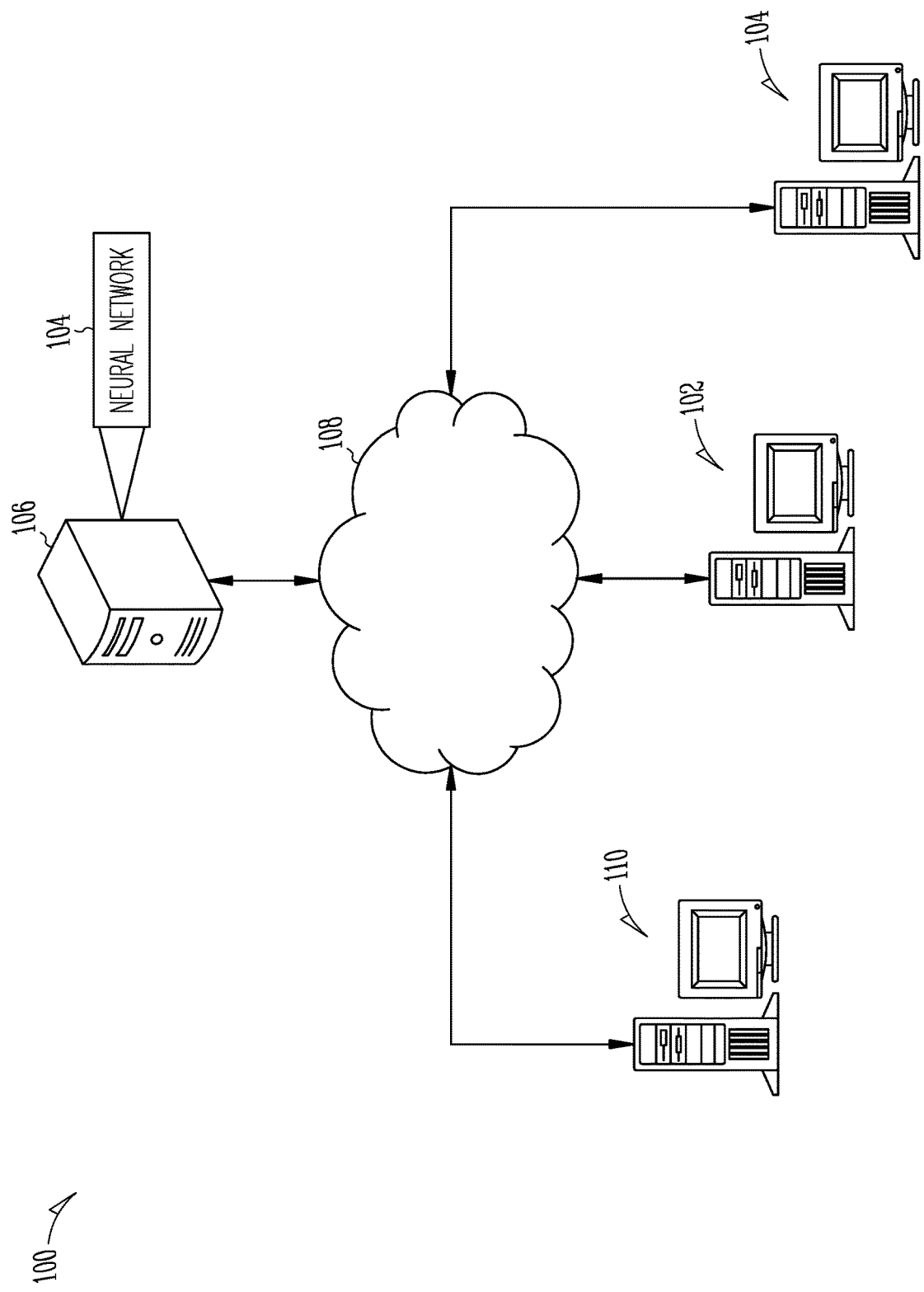

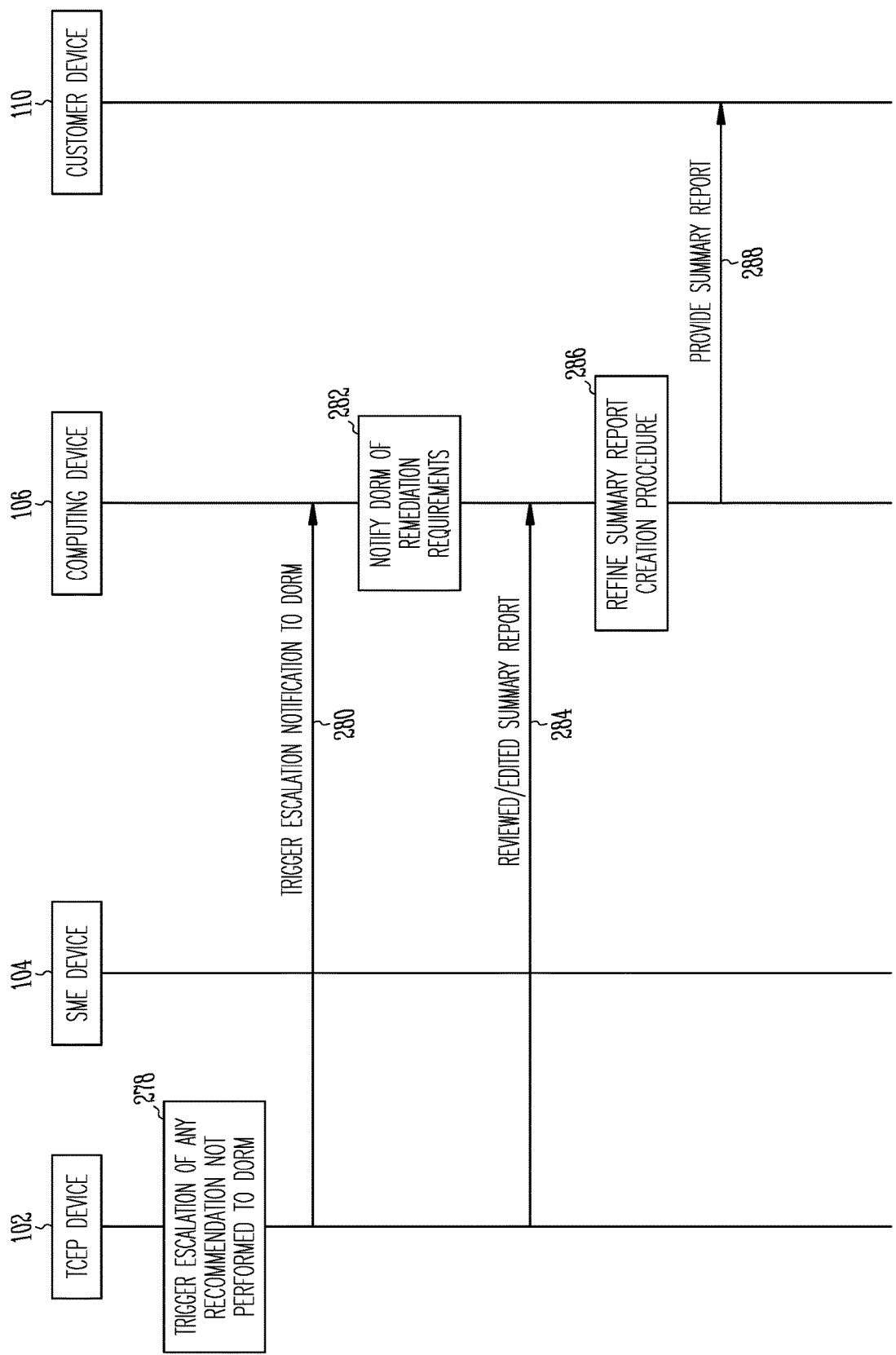

WELLS FARGO | WELLS FARGO | WELLS FARGO TECHNOLOGY

TECHNICAL CONTROL EVALUATION PROGRAM

THE INTENT OF THIS COMMUNICATION IS TO ADVISE YOU THAT THE WELLS FARGO TECHNOLOGY RISK MANAGEMENT, TECHNICAL CONTROL EVALUATION PROGRAM (TCEP) IS BEING IMPLEMENTED FOR <ENTER PROJECT/APP NAME HERE>. THIS PROGRAM HAS BEEN DESIGNED TO HAVE MINIMAL IMPACT ON THE OTHER PROGRAM FUNCTIONS.

FOR ALL <ENTER PROJECT/APP NAME HERE> PROJECTS, RISK MANAGEMENTS TCEP EVALUATION WILL INCLUDE <ENTER WHAT WILL BE EVALUATED HERE>. ALL FUNCTIONAL TESTING, AND E2E/INTERFACE/SOR TESTING WILL BE EVALUATED. FOR EACH RELEASE, THE REQUIRED DELIVERABLES TO THE RISK MANAGEMENT TEAM ARE AS FOLLOWS:

1. ALL APPLICABLE BUSINESS REQUIREMENTS DOCUMENT(S) ~114A
2. ALL APPLICABLE FUNTIONAL SPECIFICATION DOCUMENT(S) ~114B
3. ALL APPLICABLE USER STORIES (IF APPLICABLE) ~114C
4. QUALITY ASSURANCE/TEST LEAD GENERATED REQUIREMENTS TRACEABILITY MATRIX(CES) ~114D
5. ONGOING INFORMATION ON ANY PLANNED TEST CASES THAT WILL NOT BE EXECUTED ~114E
6. FINAL DEFECT REPORTS INCLUDING DISPOSITION OF ALL DEFECTS ~114F
7. FINAL SIGNOFF ON E2E/INTERFACE TESTING ~114G

ITEMS 1-3 WILL BE OBTAINED FROM PROJECT DOCUMENTATION VIA EMPT AND/OR SHAREPOINT (IF APPLICABLE). RISK MANAGEMENT TCEP WILL WORK DIRECTLY WITH THE QA/TEST LEAD(S) FOR ITEMS 4-7 AS WELL AS TO UNDERSTAND ANY TESTING COMPLEXITIES THAT MAY BE ENCOUNTERED DURING TESTING. DEVELOPMENT LEADS WILL ALSO BE ENGAGED TO UNDERSTAND ANY TECHNICAL COMPLEXITIES WITH THE CODE/CHANGES AS WELL AS TO UNDERSTAND IF THE CHANGES WILL IMPACT THE EXISTING SECURITY PLAN(S).

RISK MANAGEMENT TCEP WILL PROVIDE TO THE PROJECT TEAM A FORMAL PROJECT SUMMARY COMPLETIONS REPORT THAT INCLUDES KEY PROJECT INFORMATION, A FORMAL CHECKLIST OF ALL DOCUMENTATION EVALUATED, THE LIST ALL SUGGESTED ADDITIONS, CHANGES, ETC. BACK TO THE LEADS.

SUMMARY

INTRODUCTION ~119
<BRIEF STATEMENT OF PROJECTS, TEST & CYCLE OBJECTS AND CONDITIONS>

REFERENCE DOCUMENTS ~121

| DOCUMENT TITLE AND LOCATION PATH | VERSION AND/OR DATE |
|---|---|
| <TEST PLAN DOCUMENT AND LOCATION PATH> | |
| <TEST STRATEGY AND LOCATION PATH> | |
| <DEFECT REPORTS> | |
| <TEST RESULTS AND LOCATION PATH> | |

TCEP SCOPE ~123
<LIST THE SCOPE OF THE TCEP INVOLVEMENT HERE. PLEASE BE SURE TO INCLUDE ANY AREAS OF COMPLEXITY THAT COULD CAUSE ADDITIONAL RISK>

PROJECT SCOPE~125
<LIST THE FULL SCOPE OF THE PROJECT UNDER TEST HERE. PLEASE BE SURE TO INCLUDE ANY AREAS OF COMPLEXITY THAT COULD CAUSE ADDITIONAL RISK>

*Fig. 4A*

GENERAL PROJECT INFORMATION ~ 127

<LIST INFORMATION ABOUT THE PROJECT AND/OR TCEP HERE. ADD INFORMATION SUCH AS COMPLEXITIES OR ISSUES TCEP HAD DURING THE PROJECT AS WELL AS PARTICULARS ABOUT THE PROJECT ITSELF THAT SHOULD BE INCLUDED IN THE REPORT HERE.>

OPEN DEFECTS (FROM CURRENT PROJECT) ~ 129

LIST ALL THE DEFECTS DISCOVERED DURING THE PERIOD OF TESTING COVERED BY THIS REPORT. IF NONE, STATE "NONE." NOTE: INSERTING AN EXCEL OR ALM EXPORT REPORT WITH THIS INFORMATION IS ALSO ACCEPTABLE.

| DEFECT NUMBER | TITLE (HEADLINES) | WORKAROUND | BUSINESS APPROVAL | RISK |
|---|---|---|---|---|

RECOMMENDATION ~ 131

<MILESTONE>
PLACE RECOMMENDATION HERE SUCH AS "AN ADDITIONAL TEST CYCLE WITHIN THE CURRENT TEST PHASE IS REQUIRED IN ORDER TO OBTAIN SIGN OFF TO PROCEED." ADD THE REASONS FOR THE SIGN OFF OR THE EXTRA REQUIREMENTS, ETC.>

*Fig. 4B*

TECHNOLOGY CONTROL EVALUATION PROGRAM

BACKGROUND

Typically, software applications, such as financial applications, retail applications, automated teller machine (ATM) applications, manufacturing applications, or the like, go through multiple rounds of development and testing prior to being released. On occasion, the software applications need to meet various compliance standards, such as institutional standards or regulatory standards. However, errors may exist in either the institutional standards or the regulatory standards. Moreover, errors may be present between the institutional standards for the software applications and the regulatory standards for the software applications. During development, if a software application is developed according to erroneous institutional standards, the software application may not function properly.

Furthermore, if a software application is not developed in accordance with certain regulatory standards, a developer may not be able to release the software application until the software application is corrected to be compliant with the regulatory standards. Nevertheless, the software application may be far along the development phase. Thus, the resources and time spent developing the non-compliant software is wasted.

Therefore, what is needed is a system and method that solves the problems of ensuring that software applications meet various compliance standards. The system and method should be able to evaluate various standards and determine potential errors that may be present in institutional standards for software applications or between institutional standards and regulatory standards for software applications early on in the development phase of software applications.

SUMMARY

Embodiments of the present disclosure solve the problems noted above by providing a technical control evaluation program (TCEP) system and method that provides a technical risk assessment of enterprise information technology (EIT), technology risk identification, and remediation recommendations. In an embodiment, the TCEP uses a data driven methodology based on observation-based methods that are centered on compliance with various policies and standards, such as financial standards and best practices. Embodiments of the present disclosure relate to a computing device that evaluates data items and determines discrepancies and errors among the data items. Examples of data items may include business requirements documents, such as business policies, functional specifications, test plans, test scenario documents, requirements traceability matrices, regulatory policies promulgated by a regulatory agency, and the like, that may be necessary to perform the evaluations. In an embodiment, the computing device evaluates data items and determines discrepancies and errors among the data items. In particular, the computing device may use various artificial intelligence techniques, such as a neural network, to evaluate data items and determine discrepancies and errors among the data items where, for example, a neural network may be trained to improve a process of evaluating data items and determining discrepancies and errors. In an embodiment, the data items may be various policies, various standards, and best practices.

The systems and methods may refine techniques for identifying discrepancies and errors between data items in an iterative manner. For example, data items may be initially evaluated by a system in order to provide a recommendation that illustrates discrepancies and errors, such as differences between the data items. The recommendation may then be evaluated to validate the discrepancies and errors and determine if any additional discrepancies and errors were missed during the initial evaluation to provide an updated recommendation. The updated recommendation may be provided back to the system such that the system may refine the procedure used to evaluate the data items to identify the discrepancies and errors based on the updated recommendation such that the refined procedure may be used to generate future recommendations. In an embodiment, the updated recommendation, which includes recommended remediations to the discovered discrepancies and errors, is provided to an end user where the end user provides feedback on the updated recommendation. In an embodiment, a summary report may then be generated based on the feedback and the updated recommendation.

In an embodiment, the data items may include business requirements documents, such as business policies, functional specifications, test plans, test scenario documents, and requirements traceability matrices. In an embodiment, the data items may also include regulatory policies promulgated by a regulatory agency. In an embodiment, each of the business requirements documents, the functional specifications, the test plans, the test scenario documents, the requirements traceability matrices, and the regulatory policies are compared with each other to determine discrepancies and errors therebetween. In an embodiment, natural language processing (NLP) may be used to determine the discrepancies and errors between the data items. In an embodiment, the data items may be used to assist with the development of various software applications. For example, the software applications may include banking applications, financial applications, retail purchasing applications, manufacturing applications, and the like.

BRIEF DESCRIPTION OF FIGURES

FIG. 1 shows an environment in which embodiments of the present disclosure may operate.

FIGS. 2A-2E are process flows illustrating a technical control evaluation program that identifies errors in data items according to an embodiment of the present disclosure.

FIG. 3 illustrates an announcement according to an embodiment of the present disclosure.

FIGS. 4A and 4B illustrate a summary report according to an embodiment of the present disclosure.

DETAILED DESCRIPTION

Figure 2A:
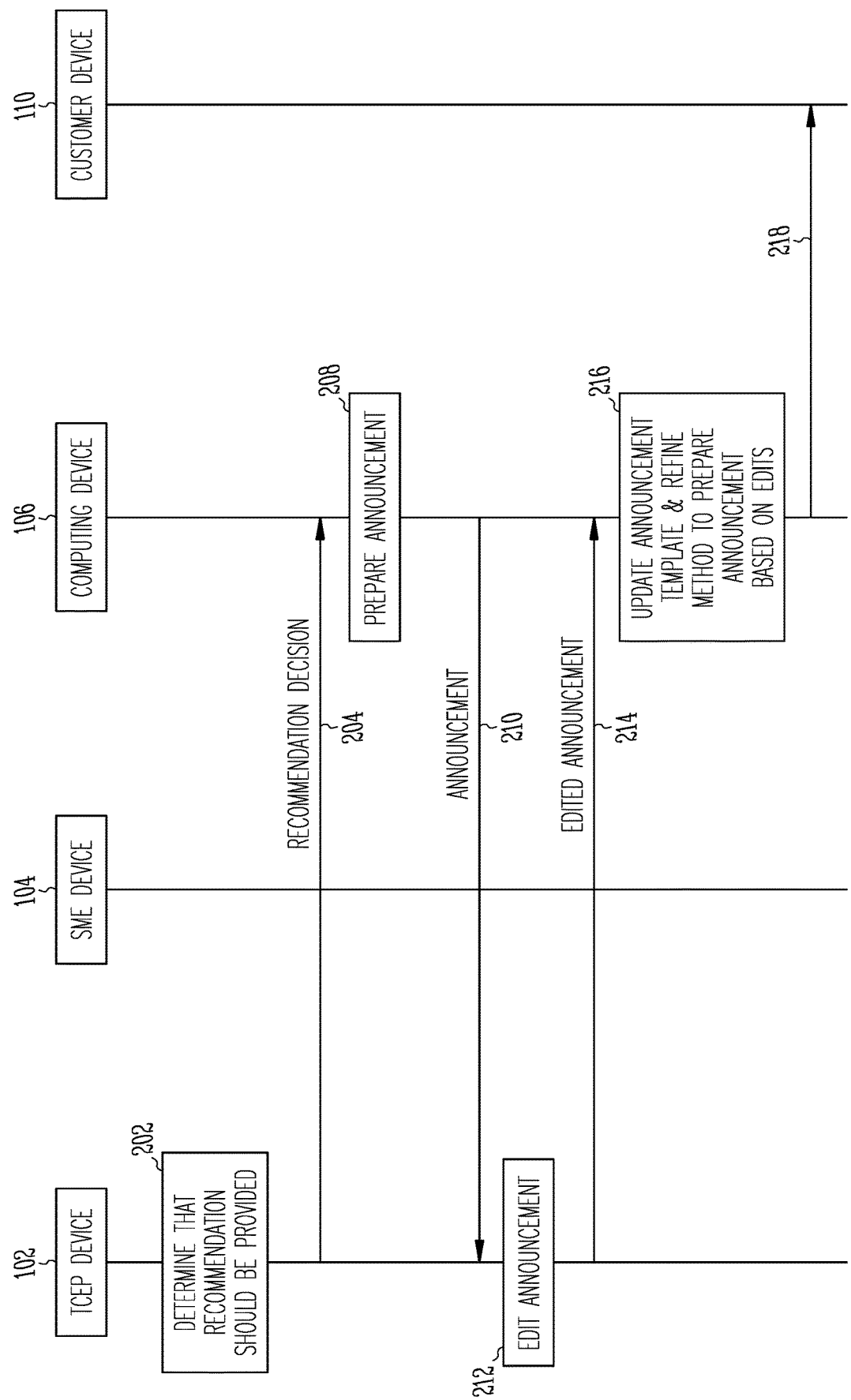

Now making reference to the Figures, and more specifically FIG. 1, an environment 100 is shown in which embodiments of the present may operate. The environment 100 includes a TCEP device 102 and a subject matter expert (SME) device 104 along with a computing device 106. In an embodiment, the TCEP device 102 and the SME device 104 communicate with each other and the computing device 106 via a network 108. Moreover, the environment 100 includes a customer device 110.

As will be discussed in greater detail below, each of the TCEP device 102, the SME device 104, the computing device 106, and the customer device 110 may incorporate an architecture that facilitates operation in the capacity of either a server of a client machine in server-client network environments, where each of these devices may be implemented as any type of computing device, such as a server computer, a personal computer (PC), or the like each having a processor configured to perform the subject matter disclosed herein. The TCEP device 102, the SME device 104, the computing device 106, and the customer device 110 may be any computing device suitable for use by a user. For example, the devices may be a desktop computer, a tablet computer, a portable media device, or a smart phone belonging to a user.

The network 108 may be any network that enables communication between or among machines, databases, and devices (e.g., the TCEP device 102, the SME device 104, the computing device 106, and the customer device 110). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof. Accordingly, the network 108 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 108 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

In an embodiment, the computing device 106 employs artificial intelligence techniques (e.g., neural networks, natural language processing, classification algorithms, clustering algorithms, etc.) in order to identify errors in data items. In an embodiment, a neural network is trained to evaluate data items and identify errors in the data items. In particular, the artificial intelligence techniques, such as a neural network, may mimic cognitive functions, such as learning and problem solving, in order to identify errors in the data items, as one skilled in the art would readily appreciate. Furthermore, the artificial intelligence processes executing on the computing device 106 may learn new heuristics while identifying errors in data items, again as one skilled in the art would readily appreciate. As will detailed below, the computing device 106 is provided feedback by a SME associated with the SME device 104 and, based on this feedback, the artificial intelligence of the computing device 106 may further refine procedures and techniques employed by the computing device 106. As will be discussed in greater detail below, the computing device 106 performs a number of operations and functions. In embodiments, the artificial intelligence techniques embodied as software executing on one or more hardware processes of the computing device 106 performs these operations and functions. Thus, when the disclosure discusses the computing device 106 performing an operation, it should be understood that this may be equivalent to the artificial intelligence within the computing device 106 performing the operation.

The customer device 110 may be any type of computing device suitable for use by a user, such as a desktop computer, a tablet computer, a portable media device, or a smart phone belonging to a user. In accordance with some embodiments, the customer device 110 may be associated with a project manager (PM), who is involved with the development of a software application.

As noted above, embodiments of the present disclosure relate to a TCEP that provides a technical risk assessment of EIT and technology risk identification and remediation recommendations. Specifically, the TCEP identifies errors in the data items using learned behavior. Initially, in an example, a customer, for example a PM, wishes to begin a software application development project, such as software for a banking application that may be used with automated teller machines (ATMs). It should be noted that while a banking application is discussed herein, embodiments of the present disclosure should not be limited to these types of applications. In particular, different types of applications, such as financial applications, retail purchasing applications, manufacturing applications, construction applications, or any other type of software application, are envisioned to be in accordance with embodiments of the present disclosure. Returning to the example, as those skilled in the art will appreciate, banking applications may have to comply with various policies. For example, the banking application may be subject to regulatory policies, such as a regulation pursuant to the Sarbanes-Oxley Act of 2002. Moreover, the banking application may be subject to certain institutional policies, such as technology systems development lifecycle and application lifecycle management policies, program and project management policies, technology risk management policies, and the like. In accordance with embodiments of the present disclosure, these various policies are referred to as data items and embodiments of the present disclosure identify errors among the various data items.

Now making reference to FIGS. 2A-2E, a process flow that illustrates a TCEP that identifies errors in data items according to an embodiment of the present disclosure. As described further below, the computing device 106A performs a number of operations in the process flow described with reference to FIGS. 2A-2E. In accordance with an embodiment of the present disclosure, artificial intelligence processes executing on the computing device 106, such as a neural network or the like, execute the operations described below.

Returning attention to FIGS. 2A-2E, a TCEP manager may decide to provide a recommendation for a software application that is being developed for a number of reasons. For example, the TCEP manager may make this decision based on problems a PM involved with software application development incurs during the development phase of the software application. To further illustrate, the problems may relate to the project not being on target, output defects, or the like. In alternative embodiments, the software application being developed may be a high-profile software application and the recommendation may be requested to ensure that the development does not incur any of the problems mentioned above. In a further embodiment, the PM may request that the TCEP manager perform a TCEP prior to beginning a software application development program. Based on this determination, the TCEP manager provides input at the TCEP input device 102, i.e., data input, etc., that a recommendation for a software application being developed by a PM should be provided.

Once a decision is made that a recommendation for a software application development program should be provided using the TCEP, the TCEP device 102 sends the recommendation decision to the computing device 106 in an operation 204. The computing device 106 prepares an announcement indicating the decision to provide a recommendation for the software application development program in an operation 208. In an embodiment, the announcement may be a message indicates the decision to provide a recommendation for the software development program. Moreover, in an embodiment, a template may be used to generate the announcement. An example of an announcement 113 is shown with reference to FIG. 3, in accordance with an embodiment of the present disclosure. In an embodiment, the announcement 113 includes data 114 that the TCEP manager would like to receive from the PM involved with the software development. In an embodiment the data 114 may include data elements 114a-114g. It should be noted that in accordance embodiments of the present disclosure, the data 114 on the announcement 113 is not limited to elements 114a-114g.

In the operation 208, the TCEP manager provides project information to the computing device 106, using Microsoft Access™, Oracle SQL Developer™, Oracle SQL Developer™, such as who is the PM associated with the software application development program, what are the timelines associated with preparing the recommendation for the software application development program, the contact information for the TPM, as well as the Project Team (developers, quality analysts, and the like), the timeline for the software application development program, and the like. During the operation 208, the computing device 106 may determine the contact information for the Project Team from the information provided to the computing device 106 by the TCEP manager, the timelines associated with preparing the recommendation, and which TCEP managers will be assisting with the TCEP. It should be noted that the information provided during the operation 208 is not limited to these examples and further types of information are contemplated by embodiments of the present disclosure.

Using this information, the computing device 106 generates the announcement 113. For example, the computing device 106 uses the contact information for the PM from the information provided to the computing device 106 by the TCEP manager, the timelines associated with preparing the recommendation, and which TCEP managers will be assisting with the TCEP to generate the announcement 113. Software such as Microsoft Access™ Oracle SQL Developer™, Oracle SQL Developer™, or the like may be used to by the computing device to generate the announcement 113.

In an embodiment, the announcement 113 may provide various details about the TCEP that will be performed. In addition to the data elements 114a-114g discussed above, the announcement 113 may discuss the various steps of the TCEP, which will be further detailed below, what the PM should expect during the TCEP, and which TCEP managers will be assisting with the TCEP. Moreover, the announcement may indicate the expectations of the TCEP manager during the TCEP and what the Project Team should expect during the TCEP, such as data 115 and 116 of the announcement 113. As an example, the announcement 113 indicates the decision to provide a recommendation for the software application development program and may indicate what the Project Team should expect, such as a remediation recommendation and a summary, as noted in data 116.

After the computing device 106 prepares the announcement 113 in the operation 208, the computing device 106 sends the announcement 113 to the TCEP device 102 in an operation 210. The TCEP manager reviews and edits the announcement 113 at the TCEP device 102 using Microsoft Access™, Oracle SQL Developer™, Oracle SQL Developer™ in an operation 212. In the operation 212, the TCEP manager may determine that the announcement 113 may be missing certain information. For example, based on the project information the TCEP provided to the computing device 106 during the operation 208, the TCEP manager may determine that the announcement 113 does not include the proper deliverables. In an embodiment, this error may occur when the computing device 106 improperly processes the information received from the TCEP manager during the operation 208. In an embodiment, the TCEP manager may correct this information by correcting that announcement 113 at the TCEP device 102. The TCEP device 102 then sends the corrected announcement 113 to the computing device 106 in an operation 214.

When the computing device 106 receives the edited announcement in the operation 214, the computing device 106 updates the announcement and updates the process used to prepare the announcement based on the edits in an operation 216. To further illustrate, while the computing device 106, via a neural network, correctly determined the contact information for the Project Team and correctly determined and input the various steps of the TCEP and which TCEP managers will be assisting with the TCEP into the announcement, the computing device 106 recognizes that the announcement 113 did not include the proper deliverables based on the edits received from the TCEP manager. In the operation 216, the computing device 106 determines how the TCEP determined what the proper deliverables should be. For example, the computing device 106 reviews the information provided during the operation 208 in order to determine where the proper deliverables were located in the information provided during the operation 208. The computing device 106 then updated the process for preparing the announcement template to include determining the proper deliverables to include on the announcement template using the techniques mentioned above. For example, the computing device 106 determines that the deliverables where pulled from a field in the information provided by the TCEP manager during the operation 208. Therefore, in an embodiment, the neural network of the computing device 106 is trained with the edited announcement such that the computing device 106 further learns to generate the announcement based on the edited announcement.

The computing device 106 learns to refer to similar fields when generating announcements in the future. After the computing device 106 updates the announcement and updates the process for generating the announcement in the operation 216, in an operation 218, the computing device 106 sends an updated announcement that indicates the decision to provide a recommendation for the software application development program, what the Project Team should expect, what type of deliverables the TCEP will generate, and, if warranted, remediation recommendations to an end user associated with the customer device 110. In accordance with an embodiment of the present disclosure, the end user may include an entity, such as a development team, where the development team includes a PM, a business analyst, and quality assurance personnel.

As an example, a customer, such as a technical project manager (TPM), wishes to begin a software application development project. In the example, the software application development program may relate to software for a banking application that may be used with ATMs. It should be noted that while a banking application is discussed herein, embodiments of the present disclosure should not be limited to these types of applications. In particular, different types of applications, such as other financial applications, retail purchasing applications, manufacturing applications, or any other type of software application are envisioned in accordance with embodiments of the present disclosure. In the example, the banking application is a high-profile project both for the organization and from a public relations standpoint. As those skilled in the art will appreciate, banking applications may have to comply with various policies. For example, the banking application may be subject to regulatory policies, as noted above. Moreover, the banking application may be subject to certain institutional policies, such as technology systems development lifecycle and application lifecycle management policies, program and project management policies, technology risk management policies, and the like. In accordance with embodiments of the present disclosure, these various policies are referred to as data items and embodiments of the present disclosure identify errors among the various data items. Since the software application development program is high profile, the TPM would like a TCEP manager to subject the data items to the TCEP in order to identify any potential risks, gaps in procedures or methodologies, and the like.

In the example, the TCEP manager determines that a recommendation for the software application that is being run by the TPM should be provided and inputs this decision into the TCEP device 102. Once the TCEP device 102 receives the input indicating the determination that a recommendation should be provided in the operation 202, the TCEP device 102 sends the recommendation decision to the computing device 106 in the operation 204. In an embodiment, the recommendation may be sent in the form of a message that indicates the recommendation decision. It should be noted that this is done while the software application development program is underway as opposed to the software application development program being completed. Therefore, the software application development program is ongoing during the TCEP. In the operation 208 of the example, the computing device 106 prepares an announcement that will be used to announce to the Project Team, the TCEP, which the TCEP manager edits in the operation 212. In the operation 212 of the example, the TCEP manager determines that the computing device 106 did not include the proper deliverables. In particular, the artificial intelligence of the computing device 106 used the incorrect information field in ascertaining the deliverables. The edited announcement template is sent to the computing device 106. In this example, the computing device 106 updates the announcement template to include the proper deliverables. Furthermore, in the operation 216, the computing device 106 refines the method used to prepare the announcement template by updating the method to include referring to the proper information field that includes the proper deliverables. In the example, once the computing device completes the operation 216, the computing device 106 sends the announcement to the Project Team in the operation 218.

Figure 2B:
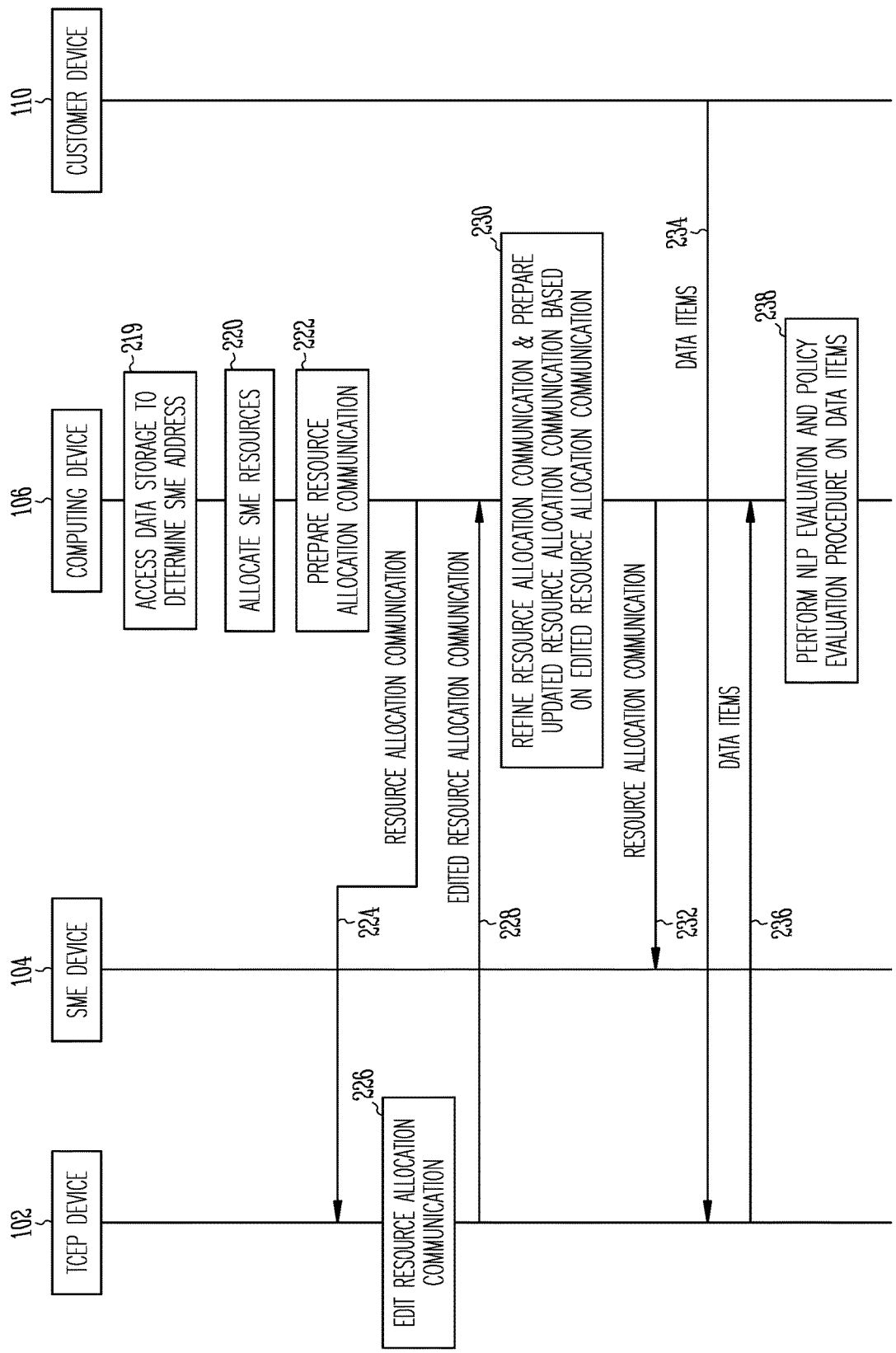

Returning to the Figures and more specifically FIG. 2B, after sending the announcement to the Project Team in the operation 218, the computing device 106 accesses data storage, such as hardware data storage associated with the computing device 106, to determine addresses associated with SME resources in an operation 219. Operation 219 may include retrieving an identification of a type of user associated with a project, such as the SME, from hardware data storage. In an operation 220, the computing device 106 allocates SME resources to the TCEP. During the operation 220, the computing device 106 evaluates the workload of TCEP SMEs along with the scope of the TCEP. Based on the workload of a SME and the scope of the TCEP, the computing device 106 uses Microsoft Access™, Oracle SQL Developer™, Oracle SQL Developer™, or the like to assign a SME to the TCEP in the operation 220. In accordance with an embodiment of the present disclosure, the SME has expertise in performing NLP evaluations and policy evaluations of data items in order to determine any errors. In an embodiment, the SME may train the neural network of the computing device 106 to perform NLP evaluations and policy evaluations of data items in order to determine any errors, as will be discussed further on. After the computing device 106 assigns the SME to the TCEP, the computing device 106 may prepare a resource allocation communication that includes the assignment of the SME to the TCEP in an operation 222. The computing device 106 may then send the resource allocation communication to the TCEP manager in an operation 224.

In an operation 226, the TCEP manager may edit the resource allocation communication and provide the edited resource allocation communication template at the TCEP device 102. In an operation 228, the TCEP device 102 provides the edits to the resource allocation to the computing device 106. Based on any edits received from the TCEP manager, the computing device 106 may update the procedure used to prepare the resource allocation and may prepare an updated resource allocation communication based on the edited resource allocation communication in an operation 230. Regarding refining the procedure used to prepare the resource allocation, using the edits made by the TCEP manager, the computing device 106 will train itself to avoid making the same errors in the future. For example, if the edit includes adding the contact information for the SME, the computing device 106 will train itself to look for the contact information of the SME the next time the computing device 106 prepares a resource allocation communication. After preparing the updated resource allocation communication, the computing device 106 may send the updated resource allocation communication to the SME device 104 associated with the allocated SME in an operation 232 using an address of the SME determined in the operation 219.

Returning to the example, after the computing device 106 sends the announcement that indicates the decision to provide a recommendation for the software application development program, the computing device 106 performs the operation 220. In the example, the computing device 106 determines that, based on the workload of the SME associated with the SME device 104 and the scope of the TCEP requested by the TPM in the operation 202, the SME associated with the SME device 104 will be allocated to the TCEP. Thus, the computing device 106 prepares a resource allocation communication in the operation 222 and forwards the resource allocation communication to the TCEP manager in the operation 224. In the operation 226, the TCEP manager reviews the resource allocation communication and determines that no edits are necessary and sends the resource allocation communication back to the computing device 106 in the operation 228. In the operation 230, the computing device 106 prepares an updated resource allocation communication and sends the updated resource allocation communication to the SME device 104 in the operation 232.

Once the computing device 106 sends the resource allocation communication to the SME device 104 in the operation 232, the TCEP manager obtains the data items to be used in the TCEP in an operation 234. In particular, a PM associated with the customer device 110 inputs the data items to be used in the TCEP and the customer device 110 sends the data items to the TCEP device 102 such that the TCEP manager may obtain the items in the operation 234. It should be noted that while the operation 234 is shown as being performed after the SME is allocated, in accordance with alternative embodiments of the present disclosure, the data items may be obtained anytime after the Project Team receives the announcement in the operation 218, i.e., prior to allocation of the SME in the operations 220-232 or contemporaneously with the operations 220-232.

After the TCEP device 102 receives the data items in the operation 234, the TCEP device 102 forwards the data items to the computing device 106 in an operation 236 such that the computing device 106 may perform a NLP evaluation and a policy evaluation procedure on the data items in an operation 238. During the operation 238, the computing device 106 tracks the data items sent in the operation 236. In an embodiment, certain data items may be used during the evaluation operations. For example, the data items may include business requirements documents, business policies, functional specifications, test plans, test scenario documents, requirements traceability matrices, regulatory policies promulgated by a regulatory agency, and the like, that may be necessary to perform the evaluations. In an embodiment, the computing device 106 may include a checklist that includes a list of these data items based on the type of application that is subject to the TCEP. The computing device 106 tracks the data items by checking the data items received in the operation 236 against the checklist. In accordance with an embodiment of the present disclosure, this may be done using any well-known artificial intelligence process.

To further illustrate, for a banking application, the checklist may list a business requirements document, a functional specification, a test plan, a test scenario document, a requirements traceability matrix, and a regulatory policy. In an embodiment, the business requirements document is a document that discusses a goal at a high level. The functional specification provides greater granularity to accomplish the goal discussed in the business requirements document. To further illustrate, the business requirements document may desire to achieve the goal of a user interface that allows for the comparison between automobiles in an automobile purchasing application. Here, the functional specification will provide greater detail in accomplishing this goal. For example, the functional specification may indicate that fields are needed to provide the user interface. According to the functional specification, the fields may include a make or model of the automobile, a color of the automobile, or the like. Furthermore, the functional specification may indicate that the user interface may require certain interfaces, such as radio buttons or the like, that allow a user to further provide information to the user interface desired by the business requirements document. The test scenario document may include data correlating to tests conducted in accordance with the functional specification. Using the automobile purchasing application example, the test scenario document may include data for tests that were conducted where a make or model of an automobile was inserted into a field along with a color of the automobile and the resulting output of entering this data into the given fields. It should be noted that different applications may require different data items and the computing device will have a checklist that lists the required data items. During the operation 238, the computing device 106 may check the data items received in the operation 236. If not all of the data items have been received, the TCEP manager may obtain the missing data items.

After confirming that all the necessary data items have been received, the computing device begins a NLP evaluation and a policy evaluation of the data items. To further illustrate, the computing device 106 will perform a NLP evaluation on the business requirements document and, during the NLP evaluation, may find that certain requirements in the business requirements document use the term "should" for tasks that need to be performed to be in compliance with the business requirements document. In the operation 238, the computing device 106 will flag the term "should" and indicate that this term should be "must" or "shall." It should be noted that this is merely an example of the type of NLP evaluations that the computing device 106 may perform. Regarding a policy evaluation, the computing device 106 may perform a policy evaluation between the data items, such as reviewing the regulatory policy for policies disclosed therein and then reviewing the business requirements document to ensure that the business requirements document includes the policies set forth in the regulatory policy. The computing device 106 may also perform a policy evaluation to confirm that the polices set forth in the business requirements document are consistent with the policies in the regulatory policy. In an embodiment, should the computing device 106 find a discrepancy between the business requirements document and the regulatory policy, the computing device 106 will flag the discrepancy. Examples of discrepancies between the business requirements document and the regulatory policy that the computing device 106 may find may include the following. The regulatory policy may require that a financial institution charge no more than $2.00 for withdrawals from an ATM. However, the business requirements document indicates that a software application developed pursuant to the business requirements document may charge up to $2.25 for withdrawals from an ATM. During the policy evaluation in the operation 238, the computing device 106 may find this discrepancy and flag this discrepancy. It should be noted that this is merely an example of the type of policy evaluations that the computing device 106 may perform.

As a further illustration of the operations performed by the computing device 106 during the operation 238, in an embodiment where the data items include a business requirements document, a functional specification, a test scenario document, and a traceability matrix, the computing device 106 will map each of these data items to assess risk. In accordance with an embodiment of the present disclosure, this may be done using any well-known artificial intelligence process. In an embodiment, the traceability matrix may match the test scenario document with the functional specification and also match the functional specification with the business requirements document. Here, the test scenario document includes test cases that may be performed in accordance with the requirements set forth in the functional specification. Thus, the test cases described in the test case scenario document should match the functional specification. Moreover, the functional specification should cover requirements set forth in the business requirements document. In the operation 238, the computing device 106 evaluates the traceability matrix to confirm that the test cases described in the test case scenario document match the functional specification and the functional specification covers requirements set forth in the business requirements document. In the operation 238, the computing device 106 may determine that the test cases in the test case scenario documents do not match with the functional specification.

Alternatively, or additionally, the computing device 106 may determine that the functional specification does not match the business requirements document.

Figure 2C:
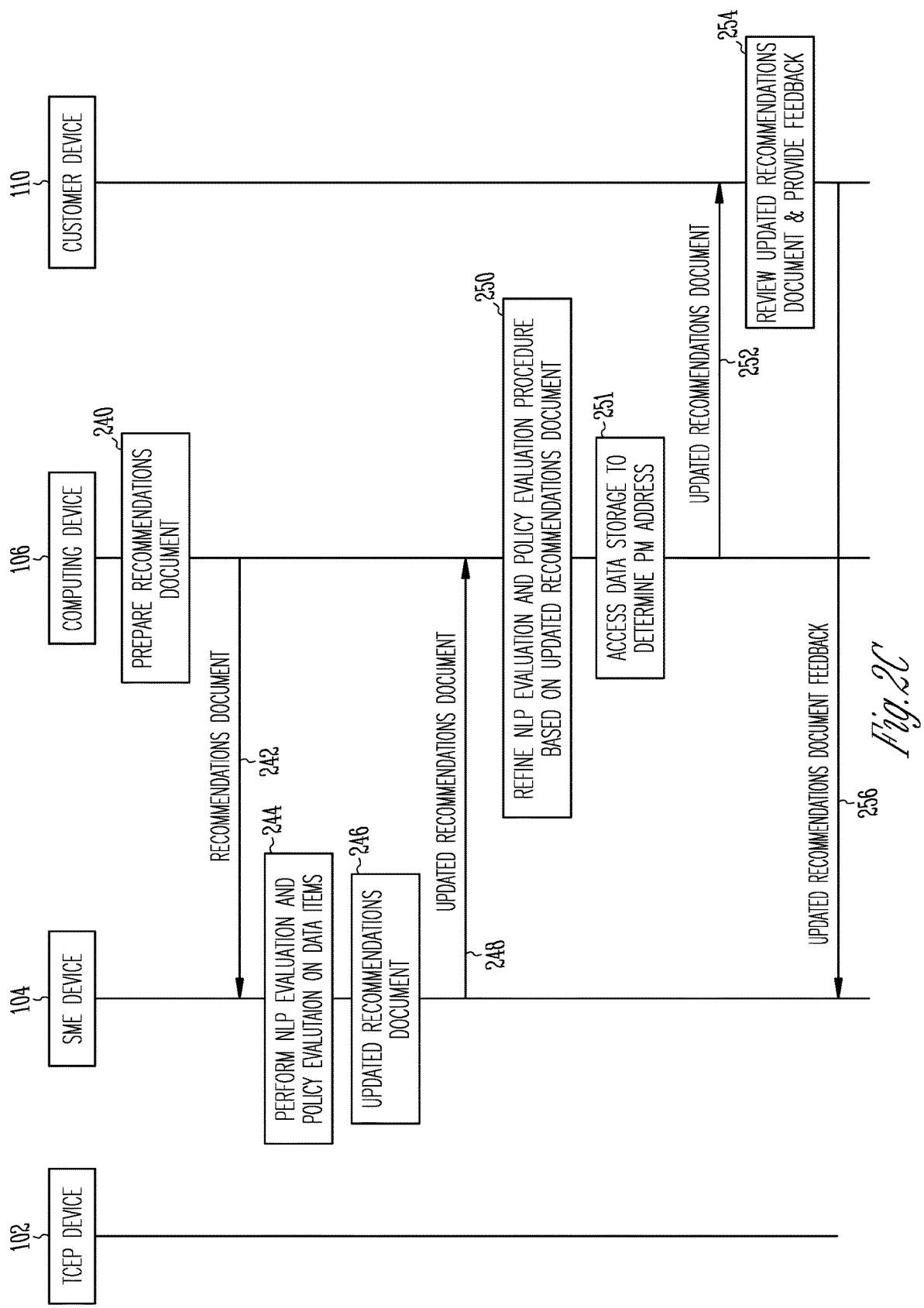

After the computing device performs the NLP and policy evaluations in the operation 238, the computing device 106 performs an operation 240, where a recommendations document based on the NLP and policy evaluations performed in the operation 240 is prepared, as shown with regards to FIG. 2C. In the operation 240, if the computing device finds any errors in the operation 238, the computing device 106 will recommend that all of the errors be remediated in the recommendations document prepared in the operation 240. For example, all errors found in the operation 240 will be listed in the recommendations document. Furthermore, the recommendations document will recommend that the errors be remediated. To further illustrate, in the ATM withdrawal fees example described above, if the computing device 106 flags this discrepancy, the recommendations document will recommend remediating the business requirements document to limit the ATM withdrawal fees to $2.00 in order to be compliant with the regulatory policy.

Returning to the example, the data items forwarded from the customer device 110 associated with the TPM in the operation 234 include a business requirements document, a functional specification, a test scenario document, and a traceability matrix. Thus, in the operation 238, the computing device 106 evaluates the traceability matrix to confirm that the test cases described in the test case scenario document match the functional specification and the functional specification covers requirements set forth in the business requirements document. In the example, in the operation 238, when the computing device 106 matches the test cases in the test case scenario document with the functional specification, the computing device 106 determines that one of the specifications listed in the functional specification has not been tested. As noted above, the test case scenario should match up to the functional specification. As an example, all the specifications in the functional specification should have a test conducted that tests each of the specifications. These tests are shown in the test cases described in the test scenario document. In the example, during the operation 238, the computing device 106 determines that a specification Z of the specifications listed in the functional specification has not been tested.

Furthermore, in the example, the functional specification indicates that certain fields in the software, such as comments on the code, may be modified by making additions to the comments. However, the functional specification does not specify that modifications to the comments should also include a deletion function. Accordingly, in the operation 240, the computing device 106 prepares a recommendations document that lists errors found with regards to the testing for the specification Z and the deletion function. Moreover, the recommendations document suggests remediation by performing a test that tests the specification Z and that the functional specification should be updated to indicate that modifications to the comments should include a deletion function.

After the computing device 106 prepares the recommendations document in the operation 240, the computing device 106 sends the recommendations document to the SME device 104 in an operation 242. When the SME device 104 receives the recommendations document in the operation 242, the SME performs a separate NLP evaluation and policy evaluation to determine if the computing device 106 missed any discrepancies or errors in the operation 238. If the SME determines that the computing device 106 missed discrepancies or errors, the SME provides this input to the SME device 104 and the SME device 104 prepares an updated recommendations document in an operation 246 and forwards the updated recommendations document to the computing device 106 in an operation 248.

Returning to the example, when the SME performs the separate NLP evaluation and policy evaluation of the data items during the operation 244, the SME may notice that on one page of the functional specification, a data output field in the functional specification may indicate that an output generated in accordance with the functional specification should have nine digits. Meanwhile, further on in the functional specification, such as three pages later, another data output field in the functional specification may indicate that an output generated in accordance with functional specification should have twelve digits. The different outputs may cause problems for the software application that is being developed with the functional specification. Therefore, in the example, the SME provides this input to the SME device 104 and the SME device 104 will generate an updated recommendations document that, in addition to the errors found by the computing device 106 in the operation 238, i.e., a specification Z of the specifications listed in the functional specification has not been tested and the lack of a deletion function, lists the discrepancy associated with the data output fields in the functional specification. Furthermore, the SME device 104 sends the updated recommendation documents to the computing device in the operation 248.

When the computing device 106 receives the updated recommendations document in the operation 248, the computing device 106 determines that the computing device 106 missed the error found by the SME in the operation 244. Thus, in an operation 250, the computing device 106 updates the NLP and policy procedures used in the operation 238 based on the updated recommendations document generated by the SME in the operation 246. In an embodiment, using the updated recommendations document, the neural network of the computing device 106 is trained to search for the errors found by the SME in the operation 240 by updating the NLP and policy procedures used in the operation 238. Moreover, after receiving the updated recommendations document, the computing device 106 accesses the data storage, such as hardware data storage associated with the computing device 106, to determine addresses associated with a PM in an operation 251. Operation 251 may include retrieving an identification of a type of user associated with a project, such as the PM, from hardware data storage.

Turning attention back to the example, in the operation 250, the computing device 106 determines that the error associated with the data output fields in the functional specification was missed by the computing device 106 in the operation 238. As mentioned above, the computing device 106 utilizes artificial intelligence processes by employing a neural network. In the example, the computing device 106 recognize that the error found by the SME relates to data output fields. Therefore, using artificial intelligence processes, the computing device 106 learns that during the operation 238, a data output field in one portion of an data item should be compared with a data output field in another portion of an data item. To further illustrate, the neural network of the computing device 106 is trained to compare a data output field in one portion of a data item with a data output field in another portion of a data item. Moreover, based on the need to compare data output fields, in accordance with embodiments of the present disclosure, the computing device 106 learns that all types of data fields in data items should be compared. To further illustrate, in addition to comparing data output fields in a functional specification, the neural network of the computing device 106 is trained that an input data field in one location of an data item, such as the functional specification, should be compared with another input data field in another location of the data item, such as the functional specification. Therefore, in accordance with embodiments of the present disclosure, the SME is training the neural network of the computing device 106, via artificial intelligence processes, to perform NLP and policy evaluations. As detailed above, the SME corrects first outputs of the computing device 106 and, based on the corrected outputs, the computing device 106 updates procedures used to generate the first output.

After the computing device 106 updates the NLP and policy procedures used in the operation 238 based on the updated recommendations document generated by the SME in the operation 246, the computing device 106 forwards the updated recommendations document to the customer device 110 associated with the Project Team in an operation 252. The Project Team then provides feedback in the form of input to the customer device 110 on the updated recommendations document in an operation 254 and the customer device 110 sends the feedback to the SME as updated recommendations document feedback to the SME device 104 in an operation 256.

Turning attention back to the example, the computing device 106 sends the updated recommendations document to the Project Team in the operation 252 and the TPM reviews the updated recommendations document in the operation 254. In the example, as noted above, the updated recommendations document listed that one of the errors found related to the lack of a delete function. In the operation 254, the Project Team recognizes that this particular software application development program is exempt from requiring the ability to provide a deletion function in relation to modifying comments in software code. Therefore, in the operation 254, Project Team may indicate that a deletion function as mentioned in the updated recommendations document is not necessary. Moreover, the Project Team may indicate that the software application development program received an exemption for this feature. In the updated recommendations document feedback provided to the SME in the operation 256, the Project Team may note that the software application development program is exempt from providing the deletion function.

Figure 2D:
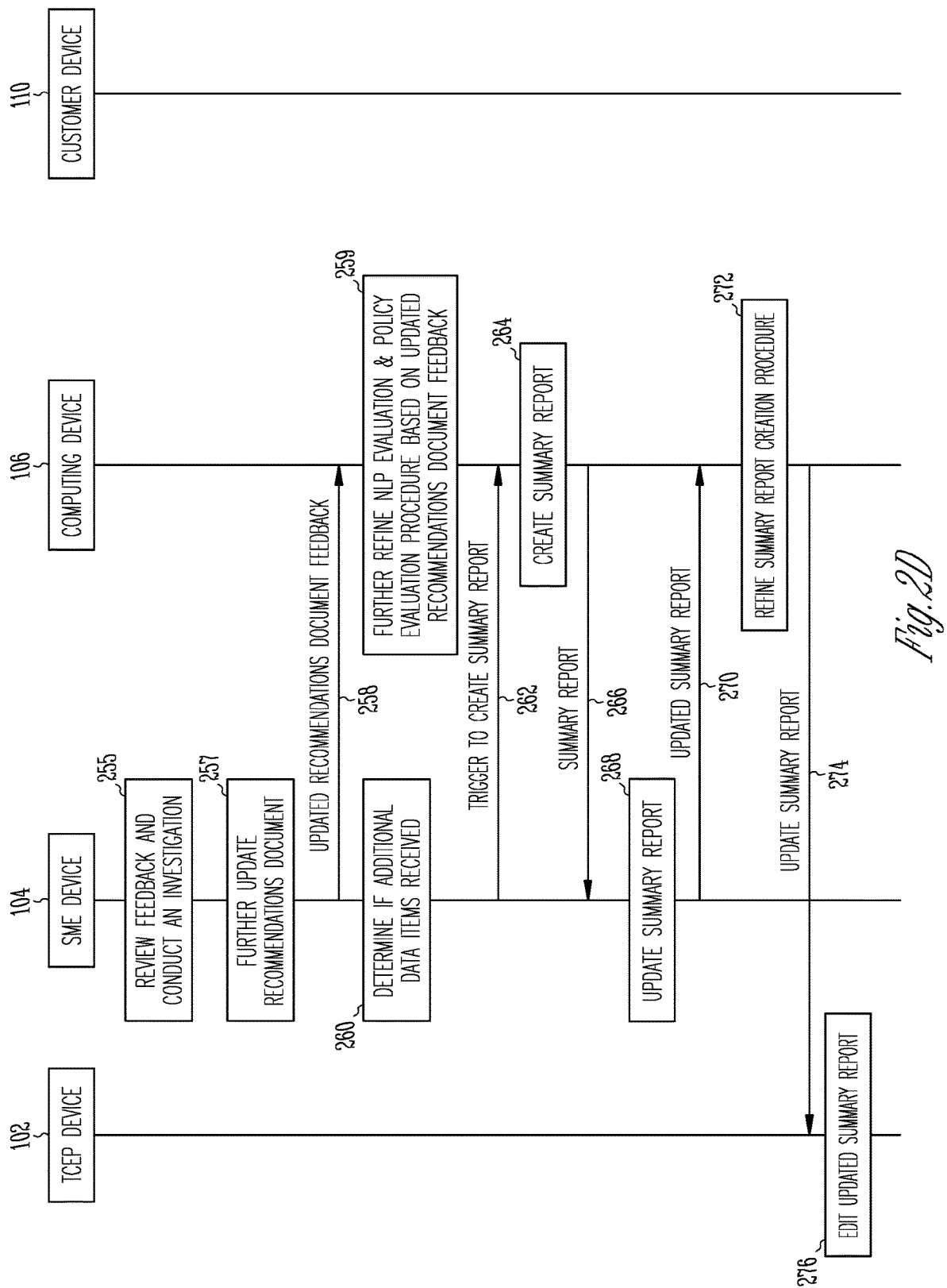

Now making reference to FIG. 2D, in an operation 255, the SME may review the feedback provided by the Project Team displayed at the SME device 104. In an embodiment, if the updated recommendations document feedback disagrees with some errors noted in the updated recommendations document, the SME conducts an investigation using the SME device 104 to determine if the software application development program is exempt from having to address any errors noted in the updated recommendations document. If the SME determines that the software application development program is exempt from the error noted in the updated recommendations document, the SME further updates the recommendations document in view of the feedback at the SME device 104 by inputting the updates into the SME device 104 in an operation 257. The SME device 104 then provides the further updated recommendations document to the computing device 106 in an operation 258. When the computing device 106 receives the further updated recommendations document in the operation 258, the computing device 106 further updates the NLP and policy procedures based on the further updated recommendations document in an operation 259 as discussed above with reference to the operation 250.

Returning to the example, in the updated recommendations document feedback sent by the Project Team in the operation 256, the Project Team indicated that the software application development program is exempt from providing the deletion function. As such, the SME investigates whether or not the Project Team is correct in asserting that the software application development program has the exemption. During the investigation, the SME determines that the application may function without the deletion function. More specifically, the SME determines that the banking application will operate properly without the ability to delete comments made in the software code.

After the computing device 106 further refines the NLP and policy procedures based on the further updated recommendations document in the operation 259, the SME determines if additional data items have been received in an operation 260 with the SME device 104. If additional data items have been received, the operations 238-260 are repeated with the additional data items. It should be noted that while the operation 260 is shown as being performed after the operation 259, in accordance with embodiments of the present disclosure, the operation 260 may be performed before the operation 259 or contemporaneously with the operation 259.

If the SME determines that there are no additional data items, the SME sends a trigger to create a summary report to the computing device in an operation 262. In response to receiving the trigger in the operation 262, the computing device 106 creates a summary report in an operation 264. In an embodiment, the summary report created by the computing device 106 in the operation 264 summarizes what was evaluated during the TCEP, such as the data items that were evaluated along with summarizing the errors that were found. Moreover, in an embodiment, the summary report indicates the remediation recommendations that were made, which of the remediation recommendations that the TPM elected to defer, and the risks that are associated with deferring on the remediation recommendations. In an embodiment, the summary report also indicates whether the TPM may continue with the software application development program. An example of a summary report 117 is shown with reference to FIGS. 4A and 4B.

Making reference to FIGS. 4A and 4B, the summary report 117 includes an introduction 119, a reference documents section 121, a TCEP scope section 123, and a project scope section 125. In addition, the summary report 117 includes general project information 127, open defect information 129, and a recommendation 131. In an embodiment, the introduction 119 may include a statement of the project, test objects, cycle objects, and conditions. The reference documents section 121 may list the data elements used during the method 200 and the TCEP scope section 123 may list the scope of the TCEP involvement, which may include any areas of complexity that could cause additional risk. The project scope section 125 lists the scope of the project being tested. The project scope section 125 may also include any areas of complexity that could cause additional risk. In an embodiment, the general project information 127 may include information about the project evaluated in the method 200 that may include complexities or issues a TCEP encountered in accordance with an embodiment. The open defect information 129 may include any defects discovered while executing the method 200 and the recommendation 131 may provide a recommendation. A defect may include, as discussed above, a regulatory policy that may require that a financial institution charge no more than $2.00 for withdrawals from an ATM. However, the business requirements document indicates that a software application developed pursuant to the business requirements document may charge up to $2.25 for withdrawals from an ATM. In an embodiment, the open defect information 129 may reflect this type of defect.

Returning to the example, the SME determines in the operation 260 that no additional data items have been received. Therefore, in the example, the SME sends a trigger to the computing device 106 to create a summary report in the operation 262 and the computing device 106 creates a summary report in the operation 264. In the example, the summary report generated by the computing device 106 indicates that the data items examined included a business requirements document, a functional specification, a test scenario document, a traceability matrix, and regulatory policies associated with banking applications. Moreover, the summary report generated by the computing device 106 lists that the errors relating to the lack of testing of the specification Z of the specifications listed in the functional specification, the deletion function, and the output data fields were found. The summary report also suggests remediating the errors summarized in the summary report. In the example, the summary report additionally indicates that the Project Team elected to defer remediating the error associated with the deletion function and discusses the risks associated with the not providing the deletion function. Here, since the software application will be able to function for its intended purpose, i.e., a banking application that may be used with ATMs, the report indicates that the risk associated with not remediating this error is low.

After the computing device 106 creates the summary report in the operation 264, the computing device 106 forwards the summary report to SME device 104 where the SME device 104 displays the summary report to the SME in an operation 266. The SME reviews the summary report, updates the summary report, and inputs the updates to the SME device 104 in an operation 268. The SME device 104 then sends the updated summary report to the computing device in an operation 270.

In the example, after the computing device 106 creates the summary report in the operation 264, the computing device 106 sends the summary report to the SME in the operation 266. In the summary report, the computing device 106 only listed the data items examined in the TCEP and the errors found in the TCEP. However, the summary report did not indicate whether or not the software application development program may proceed to the next stage. Based on the risk assessment associated with errors found in the TCEP, the SME determines that the software application development program may proceed to the next step. Therefore, the SME updates the summary report to reflect that the software application development program may proceed to the next stage. In the example, after updating the summary report, the SME sends the updated summary report to the computing device in the operation 270.

When the computing device 106 receives the updated summary report in the operation 270, the computing device 106 updates the summary report creation procedure in an operation 272. After the computing device updates the summary report creation procedure in the operation 272, the computing device 106 sends the updated summary report to the TCEP device 102 in an operation 274. Once the TCEP device 102 receives the updated summary report in the operation 274, the TCEP device 102 displays the updated summary report to the TCEP manager and the TCEP manager reviews the updated summary report, and, if necessary, edits the updated summary report and inputs the edits at the TCEP device 102, in an operation 276.

Turning back to the example, as noted above, the SME updated the summary report to reflect that the software application development program may proceed to the next stage. Thus, in the operation 272, the computing device 106 refines the summary report creation procedure to include a recommendation regarding whether or not the software application development program may proceed to the next stage. In particular, the artificial intelligence of the computing device 106 will train itself to include recommendations regarding whether or not a software application development program may move to the next stage based on the errors found in the TCEP. In addition, the computing device 106 sends the updated summary report to the TCEP manager in the operation 274. In this example, the TCEP manager reviews the updated summary report and does not provide any edits to the updated summary report in the operation 276.

When the TCEP manager reviews the updated summary report in the operation 276, the TCEP manager notes whether or not the Project Team elected to perform remediation for any errors found during the TCEP. In an operation 278, if the Project Team elected to not perform remediation for any errors found in the TCEP, the TCEP manager escalates the remediation recommendation to a divisional operational risk manager (DORM) and provides a trigger to the computing device 106 in an operation 280, as shown with regards to FIG. 2E. In an embodiment, the operation 278 is performed to inform the DORM that the Project Team for the software application development program did not remediate all of the errors found during the TCEP. Moreover, the DORM is informed that the Project Team for the software application development program did not remediate all of the errors found during the TCEP in a notification sent by the computing device 106 in an operation 282.

Returning to the example, as noted above, one of the errors found during the TCEP was the absence of a deletion function that relates to modifying comments in software code. In the operation 278, the TCEP escalates the remediation by having the computing device 106 notify the DORM that the Project Team for the software application development program did not remediate all of the errors found during the TCEP in the operation 282. In the example, the DORM is informed of the absence of a deletion function that relates to modifying comments in software code in the operation 282. Furthermore, the DORM is informed that the Project Team of the software application development program elected not to remediate the software application development program to include the missing deletion function.

Once the operation 282 is complete, the TCEP device 102 provides the summary report that was reviewed and edited in the operation 276 to the computing device 106 in an operation 284. The computing device 106 further updates the summary report in an operation 286 in a manner similar to that done in the operation 272 and forwards the summary report to the Project Team in an operation 288. It should be noted that while the operations 284 and 286 are illustrated as being done after the operations 278-282, in accordance with alternative embodiments, the operations 284 and 286 may done before or contemporaneously with the operations 278-282.

In the example, as noted above, the TCEP manager reviews the updated summary report and does not provide any edits to the updated summary report in the operation 276. In the operation 284, the TCEP manager provides the summary report back to the computing device 106. In this example, since the TCEP manager did not have any edits to the summary report, the computing device 106 does not further refine the summary report creation procedure in the operation 286 and instead forwards the summary report to the Project Team in the operation 288.

Figure 5:
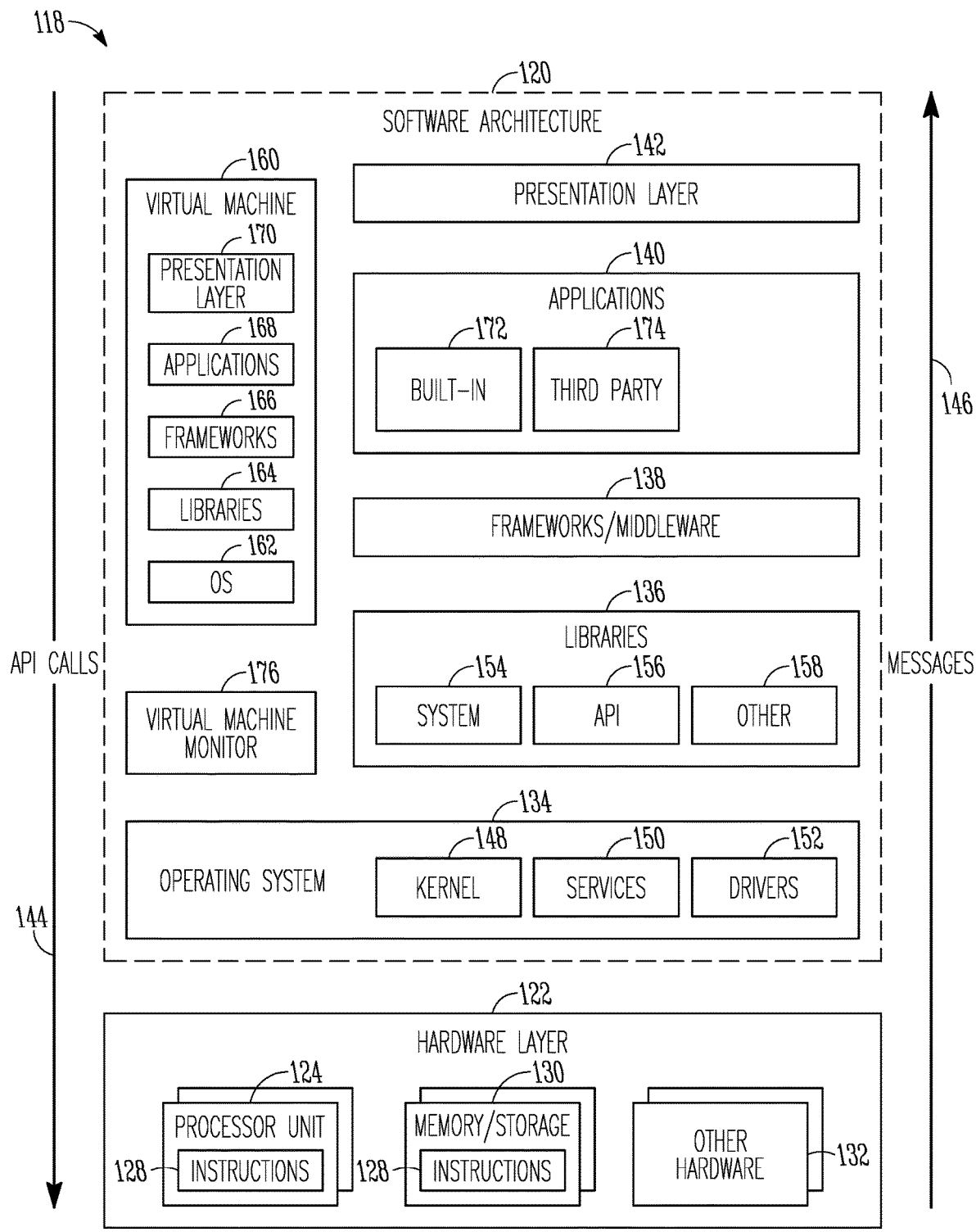
FIG. 5 is a block diagram showing one example of a software architecture for a computing device, in accordance with an embodiment of the present disclosure.

FIG. 5 is a block diagram 118 showing one example of a software architecture 120 for a computing device. The architecture 120 may be used in conjunction with various hardware architectures, for example, as described herein. FIG. 5 is merely a non-limiting example of a software architecture 120 and many other architectures may be implemented to facilitate the functionality described herein. The software architecture 120 may be executed on hardware such as, for example, any of the systems or subsystems described herein. A representative hardware layer 122 is illustrated and can represent, for example, any of the above referenced computing devices. In some examples, the hardware layer 122 may be implemented according to the architecture 120 of FIG. 5 and/or the architecture 178 of FIG. 6.

The representative hardware layer 122 comprises one or more processing units 124 having associated executable instructions 128. Executable instructions 128 represent the executable instructions of the software architecture 120, including implementation of the methods, systems, components, and so forth of FIGS. 1 and 2A-2E. Hardware layer 122 also includes memory/storage modules/data storage 130, which also have executable instructions 128. Hardware layer 122 may also comprise other hardware as indicated by other hardware 132 which represents any other hardware of the hardware layer 122, such as the other hardware illustrated as part of hardware architecture 178.

In the example architecture of FIG. 5, the software architecture 120 may be conceptualized as a stack of layers where each layer provides particular functionality. For example, the software architecture 120 may include layers such as an operating system 134, libraries 136, frameworks/middleware 138, applications 140 and a presentation layer 142. Operationally, the applications 140 and/or other components within the layers may invoke application programming interface (API) calls 144 through the software stack and receive a response, returned values, and so forth illustrated as messages 146 in response to the API calls 144. The layers illustrated are representative in nature and not all software architectures have all layers. For example, some mobile or special purpose operating systems may not provide a frameworks/middleware layer 138, while others may provide such a layer. Other software architectures may include additional or different layers.

The operating system 134 may manage hardware resources and provide common services. The operating system 134 may include, for example, a kernel 148, services 150, and drivers 152. The kernel 148 may act as an abstraction layer between the hardware and the other software layers. For example, the kernel 148 may be responsible for memory management, processor management (e.g., scheduling), component management, networking, security settings, and so on. The services 150 may provide other common services for the other software layers. In some examples, the services 150 include an interrupt service. The interrupt service may detect the receipt of a hardware or software interrupt and, in response, cause the architecture 120 to pause its current processing and execute an interrupt service routine (ISR) when an interrupt is received. The ISR may generate the alert, for example, as described herein.

The drivers 152 may be responsible for controlling or interfacing with the underlying hardware. For instance, the drivers 152 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 136 may provide a common infrastructure that may be utilized by the applications 140 and/or other components and/or layers. The libraries 136 typically provide functionality that allows other software modules to perform tasks in an easier fashion than to interface directly with the underlying operating system 134 functionality (e.g., kernel 148, services 150 and/or drivers 152). The libraries 136 may include system libraries 154 (e.g., C standard library) that may provide functions such as memory allocation functions, string manipulation functions, mathematic functions, and the like. In addition, the libraries 136 may include API libraries 156 such as media libraries (e.g., libraries to support presentation and manipulation of various media format such as MPEG4, H.302, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 136 may also include a wide variety of other libraries 158 to provide many other APIs to the applications 140 and other software components/modules.

The frameworks 138 (also sometimes referred to as middleware) may provide a higher-level common infrastructure that may be utilized by the applications 140 and/or other software components/modules. For example, the frameworks 138 may provide various graphic user interface (GUI) functions, high-level resource management, high-level location services, and so forth. The frameworks 138 may provide a broad spectrum of other APIs that may be utilized by the applications 140 and/or other software components/modules, some of which may be specific to a particular operating system or platform.

The applications 140 include built-in applications 172 and/or third-party applications 174. Examples of representative built-in applications 172 may include, but are not limited to, a contacts application, a browser application, a book reader application, a location application, a media application, a messaging application, and/or a game application. Third-party applications 174 may include any of the built-in applications 172 as well as a broad assortment of other applications. In a specific example, the third-party application 174 (e.g., an application developed using the Android™ or iOS™ software development kit (SDK) by an entity other than the vendor of the particular platform) may be mobile software running on a mobile operating system such as iOS™, Android™ Windows® Phone, or other mobile computing device operating systems. In this example, the third-party application 174 may invoke the API calls 144 provided by the mobile operating system such as operating system 134 to facilitate functionality described herein.

The applications 140 may utilize built-in operating system functions (e.g., kernel 148, services 150 and/or drivers 152), libraries (e.g., system libraries 154, API libraries 156, and other libraries 158), frameworks/middleware 138 to create user interfaces to interact with users of the system. Alternatively, or additionally, in some systems, interactions with a user may occur through a presentation layer, such as presentation layer 142. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 5, this is illustrated by virtual machine 160. A virtual machine creates a software environment where applications/modules can execute as if they were executing on a hardware computing device. A virtual machine 160 is hosted by a host operating system (operating system 134) and typically, although not always, has a virtual machine monitor 176, which manages the operation of the virtual machine 160 as well as the interface with the host operating system (i.e., operating system 134). A software architecture executes within the virtual machine 160 such as an operating system 162, libraries 164, frameworks/middleware 166, applications 168 and/or presentation layer 170. These layers of software architecture executing within the virtual machine 160 can be the same as corresponding layers previously described or may be different.

Figure 6:
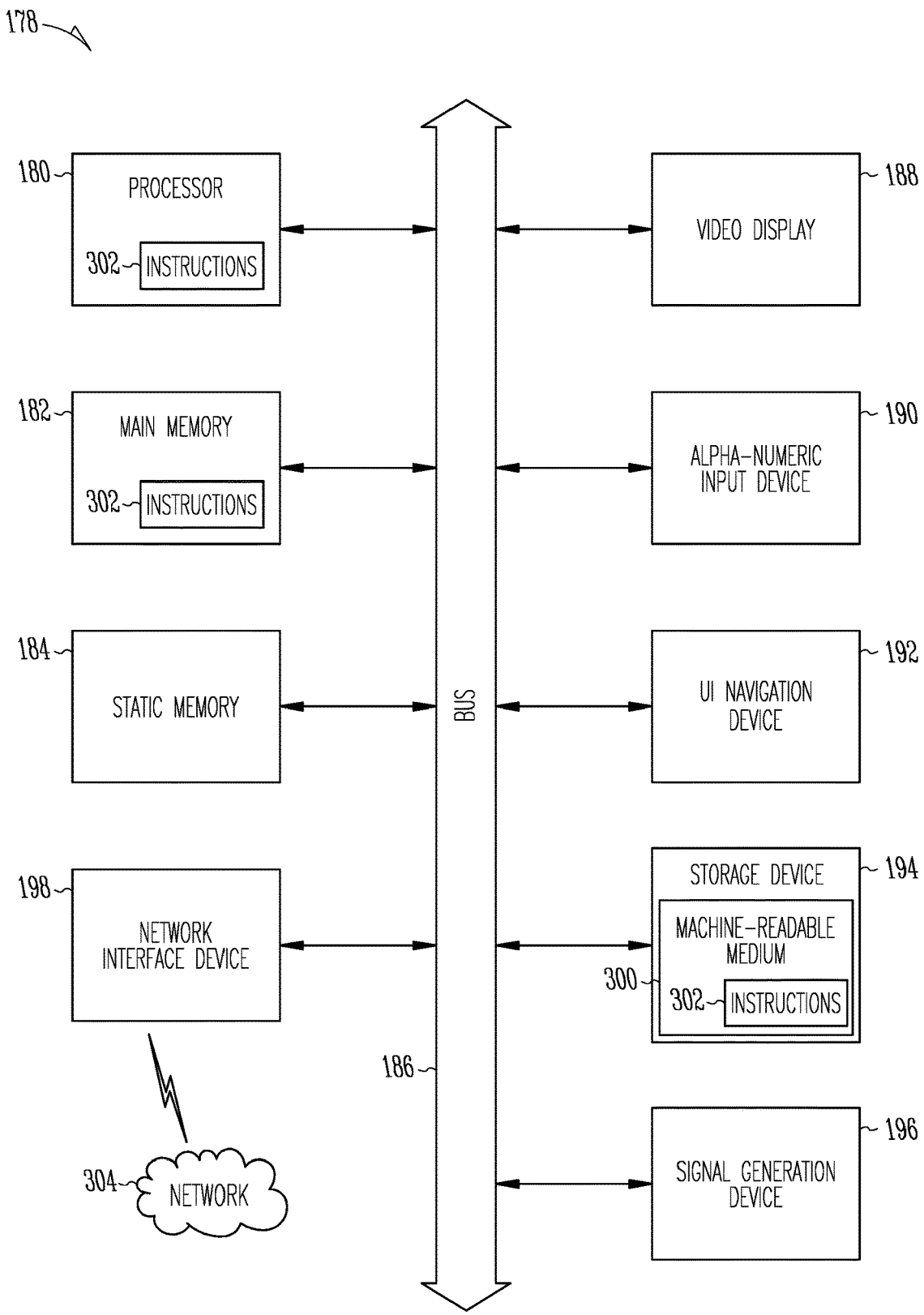
FIG. 6 is a block diagram illustrating a computing device hardware architecture, within which a set or sequence of instructions can be executed to cause the machine to perform examples of any one of the methodologies discussed herein, in accordance with an embodiment of the present disclosure.

FIG. 6 is a block diagram illustrating the computing device hardware architecture 178, within which a set or sequence of instructions can be executed to cause the machine to perform examples of any one of the methodologies discussed herein. For example, the architecture 178 may execute the software architecture 120 described with respect to FIG. 5. The architecture 178 may operate as a standalone device or may be connected (e.g., networked) to other machines. In a networked deployment, the architecture 178 may operate in the capacity of either a server or a client machine in server-client network environments, or it may act as a peer machine in peer-to-peer (or distributed) network environments. The architecture 178 can be implemented in a personal computer (PC), such as any of the TCEP device 102, the SME device 104, and the computing device 106, a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 178 includes a processor unit 180 comprising at least one processor (e.g., a central processing unit (CPU), a graphics processing unit (GPU) or both, processor cores, compute nodes, etc.). The architecture 178 may further comprise a main memory 182 and a static memory 184, which communicate with each other via a link 186 (e.g., bus). The architecture 178 can further include a video display unit 188, an alphanumeric input device 190 (e.g., a keyboard), and a user interface (UI) navigation device 192 (e.g., a mouse). In some examples, the video display unit 188, input device 190 and UI navigation device 192 are incorporated into a touch screen display. The architecture 178 may additionally include a storage device 194 (e.g., a drive unit), a signal generation device 196 (e.g., a speaker), a network interface device 198, and one or more sensors (not shown), such as a global positioning system (GPS) sensor, compass, accelerometer, or other sensor.

In some examples, the processor unit 180 or other suitable hardware component may support a hardware interrupt. In response to a hardware interrupt, the processor unit 180 may pause its processing and execute an interrupt service routine (ISR), for example, as described herein.

The storage device 194 includes a machine-readable medium 300 on which is stored one or more sets of data structures and instructions 302 (e.g., software) embodying or utilized by any one or more of the methodologies or functions described herein. The instructions 302 can also reside, completely or at least partially, within the main memory 182, static memory 184, and/or within the processor unit 180 during execution thereof by the architecture 178, with the main memory 182, static memory 184, and the processor unit 180 also constituting machine-readable media. Instructions 302 stored at the machine-readable medium 300 may include, for example, instructions for implementing the software architecture 120, instructions for executing any of the features described herein, etc.

While the machine-readable medium 300 is illustrated in an example to be a single medium, the term "machine-readable medium" can include a single medium or multiple media (e.g., a centralized or distributed database, and/or associated caches and servers) that store the one or more instructions 302. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 302 can further be transmitted or received over a communications network 304 using a transmission medium via the network interface device 198 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions (e.g., instructions 302) for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for training a neural network of a first computing device to evaluate data items, the method comprising:
   receiving a plurality of data items at the first computing device;
   evaluating, by the neural network with an evaluation procedure, the plurality of data items, wherein the neural network evaluates the plurality of data items by determining a difference between a first data item of the plurality of data items and a second data item of the plurality of data items;
   preparing, by the neural network, a recommendation based on the difference between the first data item of the plurality of data items and the second data item of the plurality of data items;
   forwarding the recommendation from the first computing device to a second computing device;
   receiving an updated recommendation from the second computing device, the updated recommendation being based on the recommendation; and
   training the neural network with the updated recommendation to evaluate the plurality of data items, wherein the computing device further learns to evaluate the data items by receiving the updated recommendation and updates the evaluation procedure based on the updated recommendation.

2. The computer implemented method of claim 1, wherein evaluating the plurality of data items further comprises detecting an inconsistency between the first data item of the plurality of data items and the second data item of the plurality of data items.

3. The computer implemented method of claim 1, wherein the first data item of the plurality of data items has a first component and evaluating the plurality of data items further comprises determining that the second data item of the plurality of data items does not have the first component.

4. The computer implemented method of claim 1, the method further comprising:
   retrieving from data storage of the first computer device, an identification of a type of user associated with a project;
   transmitting the updated recommendation to the identified user;
   receiving feedback for the updated recommendation; and
   training the neural network with the feedback for the updated recommendation, wherein the computing device further learns to evaluate the data items by receiving feedback for the updated recommendation and updates the evaluation procedure based on the feedback for the updated recommendation.

5. The computer implemented method of claim 1, the method further comprising:
   retrieving from data storage of the first computer device, an identification of a type of user associated with a project;
   creating a summary report, wherein the summary report lists the difference between the first data item of the plurality of data items and the second data item of the plurality of data items and a remediation of the difference; and
   forwarding the summary report to a device associated with the identified user.

6. The computer implemented method of claim 1, the method further comprising:
   receiving a message that indicates an evaluation should be performed from a third computing device;
   generating a message that indicates performance of the evaluation;
   forwarding the message that indicates performance of the evaluation to the third computing device;
   receiving changes to the message that indicates performance of the evaluation from the third computing device; and
   training the neural network with the changes to the message that indicates performance of the evaluation, wherein the computing device further learns to generate the message that indicates the performance of the evaluation based on the changes received from the TCEP entity.

7. The computer implemented method of claim 1, wherein the method further comprises comparing the first data item of the plurality of data items with the second data item of the plurality of data items using natural language processing.

8. A non-transitory, machine-readable medium, comprising instructions, which when performed by a processor of a first computing device, causes the processor to perform operations to:
   receive a plurality of data items at the first computing device;
   evaluate, by a neural network of the first computing device, with an evaluation procedure, the plurality of data items, wherein the neural network evaluates the plurality of data items by determining a difference between a first data item of the plurality of data items and a second data item of the plurality of data items;
   prepare a recommendation based on the difference between the first data item of the plurality of data items and second data item of the plurality of data items;
   forward the recommendation from the first computing device to a second computing device;
   receive an updated recommendation from the second computing device, the updated recommendation being based on the recommendation; and
   train the neural network with the updated recommendation to evaluate the plurality of data items, wherein the computing device further learns to evaluate the data items by receiving the updated recommendation and updates the evaluation procedure based on the updated recommendation.

9. The non-transitory, machine-readable medium of claim 8, wherein evaluating the plurality of data items further comprises detecting an inconsistency between the first data item of the plurality of data items and the second data item of the plurality of data items.

10. The non-transitory, machine-readable medium of claim 8, wherein the first data item of the plurality of data items has a first component and evaluating the plurality of data items further comprises determining that the second data item of the plurality of data items does not have the first component.

11. The non-transitory, machine-readable medium of claim 8, wherein the instructions further cause the processor to perform operations to:
retrieve from data storage of the first computer device, an identification of a type of user associated with a project;
transmit the updated recommendation to the identified user;
receive feedback for the updated recommendation; and
train the neural network with the feedback for the updated recommendation, wherein the computing device further learns to evaluate the data items by receiving feedback for the updated recommendation and updates the evaluation procedure based on the feedback for the updated recommendation.

12. The non-transitory, machine-readable medium of claim 8, wherein the instructions further cause the processor to perform operations to:
retrieve from data storage of the first computer device, an identification of a type of user associated with a project;
create a summary report, wherein the summary report lists the difference between the first data item of the plurality of data items and the second data item of the plurality of data items and a remediation of the difference; and
forward the summary report to a device associated with the identified user.

13. The non-transitory, machine-readable medium of claim 8, wherein the instructions further cause the processor to perform operations to:
receive a message that indicates an evaluation should be performed from a third computing device;
generate a message that indicates performance of the evaluation;
forward the message that indicates performance of the evaluation to the third computing device;
receive changes to the message that indicates performance of the evaluation from the third computing device; and
train the neural network with the changes to the message that indicates performance of the evaluation, wherein the computing device further learns to generate the message that indicates the performance of the evaluation based on the changes received from the TCEP entity.

14. The non-transitory, machine-readable medium of claim 8, wherein the instructions further cause the processor to perform operations to compare the first data item of the plurality of data items with the second data item of the plurality of data items using natural language processing.

15. A computing device comprising:
processing circuitry; and
a memory device including instructions embodied thereon, wherein the instructions, which when executed by the processing circuitry, configure the processing circuitry to perform operations that:
receive a plurality of data items at the system;
evaluate, by a neural network of the computing device, with an evaluation procedure, the plurality of data items, wherein the neural network evaluates the plurality of data items by determining a difference between a first data item of the plurality of data items and a second data item of the plurality of data items;
prepare, by the neural network, a recommendation based on the difference between the first data item of the plurality of data items and the second data item of the plurality of data items;
forward the recommendation from the computing device to a second computing device;
receive an updated recommendation from the second computing device, the updated recommendation being based on the recommendation; and
training the neural network with the updated recommendation to evaluate the plurality of data items, wherein the computing device further learns to evaluate the data items by receiving the updated recommendation and updates the evaluation procedure based on the updated recommendation.

16. The computing device of claim 15, wherein evaluating the plurality of data items further comprises detecting an inconsistency between the first data item of the plurality of data items and the second data item of the plurality of data items.

17. The computing device of claim 15, wherein the first data item of the plurality of data items has a first component and evaluating the plurality of data items further comprises determining that the second data item of the plurality of data items does not have the first component.

18. The computing device of claim 15, wherein the instructions further configure the processing circuitry to:
retrieve from data storage of the computing device, an identification of a type of user associated with a project;
transmit the updated recommendation to the identified user;
receive feedback for the updated recommendation; and
train the neural network with the feedback for the updated recommendation, wherein the computing device further learns to evaluate the data items by receiving feedback for the updated recommendation and updates the evaluation procedure based on the feedback for the updated recommendation.

19. The computing device of claim 15, wherein the instructions further configure the processing circuitry to:
retrieve from data storage of the computing device, an identification of a type of user associated with a project;
create a summary report, wherein the summary report lists the difference between the first data item of the plurality of data items and the second data item of the plurality of data items and a remediation of the difference; and
forward the summary report to a device associated with the identified user.

20. The computing device of claim 15, wherein the instructions further configure the processing circuitry to:
receive a message that indicates an evaluation should be performed from a third computing device;
generate a message that indicates performance of the evaluation;
forward the message that indicates performance of the evaluation to the third computing device;
receive changes to the message that indicates performance of the evaluation from the third computing device; and
train the neural network with the changes to the message that indicates performance of the evaluation, wherein the computing device further learns to generate the message that indicates the performance of the evaluation based on the changes received from the TCEP entity.

21. The computing device of claim 15, wherein the instructions further configure the processing circuitry to compare the first data item of the plurality of data items with the second data item of the plurality of data items using natural language processing.

* * * * *